Patented June 11, 1940

2,204,188

UNITED STATES PATENT OFFICE 2,204,188

POLYMETHINE DYES

Oskar Riester, Dessau-Ziebigk, Germany, assignor, by mesne assignments, to General Aniline & Film Corporation, New York, N. Y., a corporation of Delaware No Drawing. Application February 28, 1938, Serial No. 193,083. In Germany March 4, 1937

5 Claims. (Cl. 260—240)

This invention relates to new dyes and a new method for preparing those dyes.

It is known that yellow dyestuffs can be obtained from acetone dicarboxylic acid and its esters with aromatic aldehydes in presence of mineral acid. These dyestuffs are only yellow and of little intensity.

An object of the present invention is to provide a new process for the preparation of dyes of the polymethine type.

A further object of this invention is the provision of polymethine dyes, which contain in their molecule a keto group in the center of the polymethine chain and constitute a completely new class of dyestuffs.

Other objects of the invention will appear from the following description.

The new polymethine dyestuffs belong neither to the basic nor to the acid dyestuffs and are of importance in the dyeing art. They are suitable for example for dyeing acetate silk. Moreover these dyestuffs may be used for sensitizing photographic emulsions and for producing bleaching-out layers. The sensitizers are characterized by a spectrally narrow sensitization. The bleaching-out layers prepared by using these dyes are characterized by their great rapidity in forming a picture.

I have found that in presence of acetic anhydride with or without a solvent 2 mol of a substituted aldehyde containing nitrogen may be condensed with 1 mol of acetone dicarboxylic acid with elimination of 2 mol of carbon dioxide to produce dyestuffs more deeply colored than those referred to above.

The aldehyde may contain an aromatic ring or a heterocyclic nucleus derived for example from thiazole, indole, oxazole, selenazole, thiazoline, thiodiazole, quinaldine, lepidine, imidazole or the like. These bases may be substituted with all known substituents such as follows: alkyl-, alkoxy-, thioalkyl-, amino-, alkylamino-, acylamino-, aryl- and phenylene-groups. Also unsaturated substituted aliphatic-amino aldehydes may be used.

The following examples illustrate the invention but they are not intended to limit it thereto:

*Example 1.*—A solution of 2 mol of p-dimethylaminobenzaldehyde and 1 mol of acetone dicarboxylic acid in a mixture of 5 mol of acetic anhydride and 1 mol of pyridine is heated for 2 hours at 35° C. The violet dyestuff thus obtained has the following structural formula

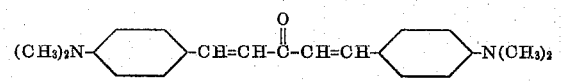

*Example 2.*—2 grams of para-methoxyindole-2-monomethine-ω-aldehyde and 1 gram of acetone dicarboxylic acid are dissolved in 5 cc. of acetic anhydride. This solution is then heated for 1 hour at 50° C. The intensely red dyestuff thus obtained has the following formula

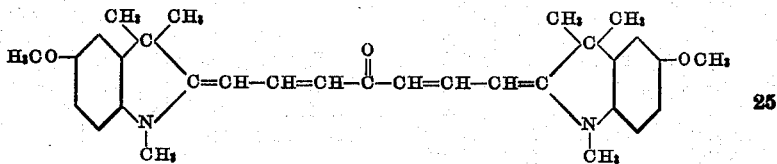

The starting aldehyde is obtained in the following manner (see German Patent No. 615,130): Methylformylaniline is condensed with phosphorus oxychloride while stirring. To the mixture there is added o-dichlorbenzene and with cooling 1.1.3-trimethyl-2-methylene-6-methoxyindoline. After the reaction is finished steam is passed into the mass. The remaining aldehyde is dried and recrystallized from ligroin.

A photographic silver bromide emulsion sensitized with this dye shows a sensitizing maximum at 5750 Å. U. The dyestuff dyes, for example, acetate silk tints which resemble those obtained with rhodamine on cotton staple.

*Example 3.*—A solution of 2 grams of indole-2-monomethine-ω-aldehyde (obtained in a manner analogous to that as described in Example 2 by means of 1.1.3-trimethyl-2-methylene-indoline) and 2 grams of acetone dicarboxylic acid in a mixture of 6 cc. of acetic acid and 6 cc. of acetic anhydride is heated for half an hour at 80° C. The red dyestuff thus obtained has the following formula

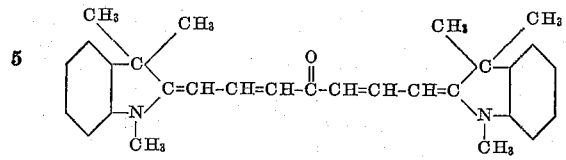

A photographic silver bromide emulsion sensitized with this dyestuff shows a sensitizing maximum at 5750 Å. U.

*Example 4.*—A dyestuff from N-methylbenzthiazole-2-monomethine-ω-aldehyde prepared in a similar manner as described in Example 2 has the following structural formula

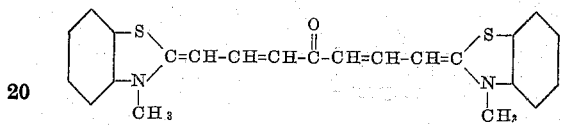

The starting aldehyde is produced in the following manner (see French Patent No. 808,598): 2-acetanilidovinylbenzthiazole methiodide is suspended in absolute ethyl alcohol and a concentrated aqueous solution of potassium hydroxide is added. The whole is refluxed for several hours. The solvent is then removed by evaporation under reduced pressure and the aldehyde extracted with hot ligroin.

A photographic silver bromide emulsion sensitized with this dyestuff shows a sensitizing maximum at 5650 and 5400 Å. U.

*Example 5.*—From N-ethylbenzthiazole-2-pentamethine-ω-aldehyde produced in the manner disclosed in U. S. Patent No. 2,152,615 dated March 28, 1939 there is obtained in a similar manner as described in Example 2 a blue dyestuff of the following structural formula

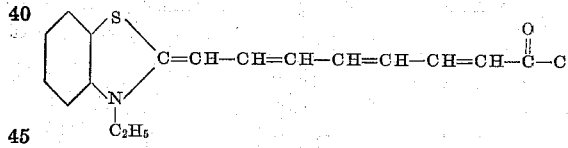

A photographic silver bromide sensitized with this dye shows a sensitizing maximum at 7000 Å. U.

*Example 6.*—From tetrahydroquinoline-N-propenal prepared as described in French Patent No. 828,384 there is obtained in a similar manner as described in Example 2 a yellow-red dyestuff of the following formula

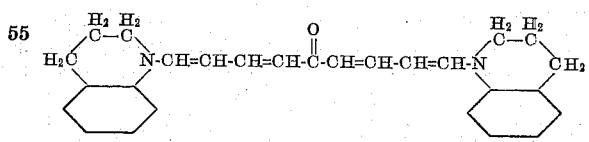

Absorption maximum about 5100° Å. U.

A photographic silver bromide emulsion sensitized with this dyestuff shows a sensitizing maximum at 5300 Å. U.

*Example 7.*—From dihydro-ω-methylindole-N-pentadienal produced in the manner disclosed in German Patent 218,616 there is obtained in a similar manner as described in Example 3 a blue-violet dyestuff of the following formula

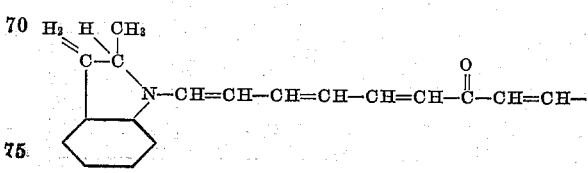

*Example 8.*—From dimethyl-N-propenal there is produced in a similar manner as described in Example 1 a yellow dyestuff of the following formula

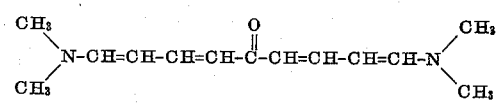

*Example 9.*—From formyl-tetrahydroquinoline and acetone dicarboxylic acid in acetic acid and acetic anhydride there is obtained a lemon-yellow dyestuff of the following formula

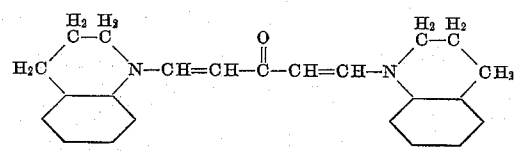

*Example 10.*—From N-ethyl-thiazolene-2-monomethine-ω-aldehyde (obtainable in a manner analogous to that as described in French Patent No. 808,598 by hydrolyzing acetanilidovinylthiazoline ethiodide by means of potassium hydroxide) there is produced an orange-yellow dyestuff of the following formula

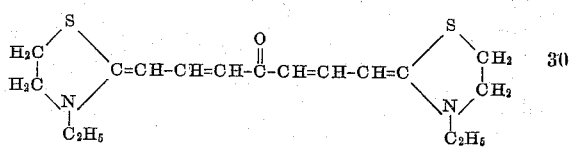

*Example 11.*—From N-ethyl ββ'-naphtho-oxazole-2-monomethine-ω-aldehyde (obtainable in a manner analogous to that as described in French Patent No. 808,598 by alkaline hydrolysis of acetanilidovinyl-ββ'-naphtho-oxazole ethiodide)

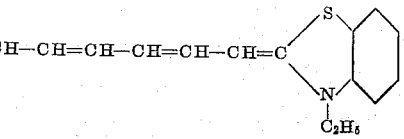

there is produced a yellow dyestuff of the following formula

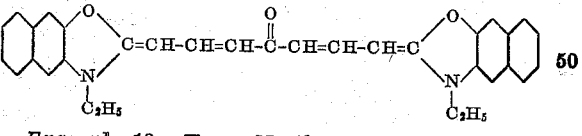

*Example 12.*—From N-ethyl p-methyl quinaldine-2-monomethine-ω-aldehyde (obtained in a manner analogous to that described in French Patent No. 808,598 by hydrolyzing anilidovinyl-6-methyl-quinoline ethiodide by means of sodium hydroxide) there is produced a yellow-red dyestuff of the following formula

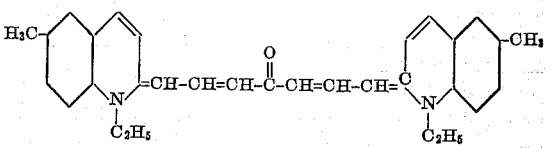

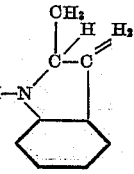

I claim:
1. A process for the preparation of a poly- methine dye corresponding with the following structural formula

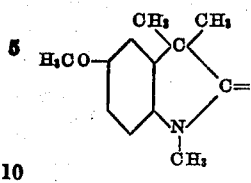

which comprises condensing two mol of p-methoxyindole-2-monomethine-ω-aldehyde with one mol of acetone dicarboxylic acid in the presence of acetic anhydride.

2. A process for the preparation of a polymethine dye corresponding with the following structural formula

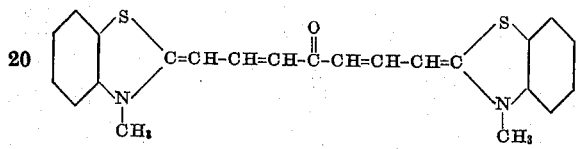

which comprises condensing two mol of N-methylbenzthiazole-2 - monomethine-ω-aldehyde with one mol of acetone dicarboxylic acid in the presence of acetic anhydride.

3. A process for the preparation of a polymethine dye corresponding with the following structural formula

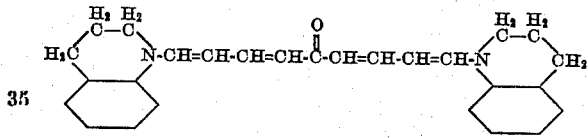

which comprises condensing two mol of tetrahydroquinoline-N-propenal with one mol of acetone dicarboxylic acid in the presence of acetic anhydride.

4. A process for the preparation of polymethine dyes which comprises condensing two mol of a compound corresponding with the following structural formula

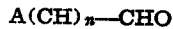

where $n$ is a member of the group consisting of 0 and an integer;

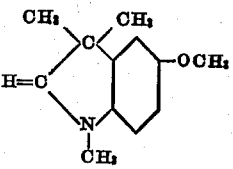

A is a member of the group consisting of

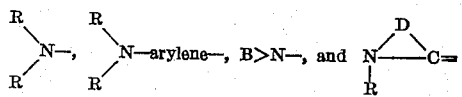

where R is an alkyl, and B and D represent the atoms necessary to form a member of the group consisting of a heterocyclic nucleus and a substituted heterocyclic nucleus, with at least one mol of acetone dicarboxylic acid in the presence of acetic anhydride.

5. A process for the preparation of polymethine dyes which comprises condensing two mol of a compound corresponding with the following structural formula

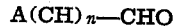

Where $n$ is a member of the group consisting of 0 and an integer;

A is a member of the group consisting of

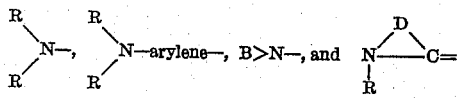

where R is an alkyl, and B and D represent the atoms necessary to form a member of the group consisting of a heterocyclic nucleus and a substituted heterocylic nucleus, with at least one mol of acetone discarboxylic acid in the presence of an indifferent solvent and acetic anhydride.

OSKAR RIESTER.